United States Patent

[11] 3,576,291

[72] Inventor Lael B. Taplin
Livonia, Mich.
[21] Appl. No. 854,189
[22] Filed Aug. 29, 1969
[45] Patented Apr. 27, 1971
[73] Assignee The Bendix Corporation

[54] VORTEX ANALOG TO DIGITAL CONVERTER HAVING TIME MODULATED OUTPUT
9 Claims, 2 Drawing Figs.

[52] U.S. Cl. .......... 235/201, 137/81.5
[51] Int. Cl. .......... G06d 5/00
[50] Field of Search .......... 235/200, 201; 137/81.5

[56] References Cited

UNITED STATES PATENTS

| | | | |
|---|---|---|---|
| 3,272,213 | 9/1966 | Jones | 137/81.5 |
| 3,276,259 | 10/1966 | Bowles et al. | 73/194 |
| 3,486,521 | 12/1969 | Mayer | 137/81.5 |
| 3,503,409 | 3/1970 | Jones | 137/81.5 |
| 3,504,688 | 4/1970 | Jones | 137/81.5 |

*Primary Examiner*—Richard B. Wilkinson
*Assistant Examiner*—Lawrence R. Franklin
*Attorneys*—Raymond J. Eifler and Plante, Arens, Hartz, Hix and Smith

ABSTRACT: An apparatus for converting an analog control signal to a digital signal in a fluid system, wherein the apparatus comprises: a vortex device in combination with a complementary flip-flop which produces time modulated pulses related to the magnitude of the control signal applied to the vortex device.

LAEL B. TAPLIN
INVENTOR.

BY Raymond J. Eifler
ATTORNEY

LAEL B. TAPLIN
INVENTOR.

BY Raymond J. Eifler
ATTORNEY

VORTEX ANALOG TO DIGITAL CONVERTER HAVING TIME MODULATED OUTPUT

BACKGROUND OF THE INVENTION

This invention relates generally to fluid signal generators, oscillators, converters, vortex devices, and more particularly, to fluid devices which combine the features of proportional and digital devices to produce a pulsating output.

Existing fluidic devices for producing a pulsating output, (e.g. U.S. Pat. No. 3,306,291) have a low signal to noise ratio and an essentially fixed frequency varying only as a result of changes in temperature. Further, such devices cannot be modified for use in combination with a bistable multivibrator to produce a time modulated signal (pulses) proportional to the magnitude of an analog control signal applied to the vortex device. Examples of prior art proportional and digital devices and an explanation of their operation may be found in standard handbooks (e.g. Fluidic System Design Guide, copyright by the Fluidonics Division of the Imperial-Eastman Corporation, Chicago, Ill.).

SUMMARY OF THE INVENTION

Therefore, it is an object of this invention to combine digital and proportional fluidic devices to produce a time modulated signal, in the form of pulses, wherein a time unbalance is created between the first half cycle and the second half cycle of each period which is related to the magnitude of an analog control signal applied to the proportional device.

It is another object of this invention to provide a fluidic apparatus capable of converting analog control signals to digital control signals with a high signal to noise ratio.

It is another object of this invention to provide a means to process signal information in the time domain, i.e. signals are represented by a time unbalance so that normal amplitude noise does not affect the signal once the signal has been converted to the time domain.

It is another object of this invention to provide a vortex oscillator having a high signal to noise ratio.

It is an object of this invention to provide a fluid circuit which produces a time modulated signal that may be unbalanced proportionally to a control signal.

The above and other objects and features of the invention will become apparent from the following detailed description taken in conjunction with the accompanying drawings which form a part of this specification.

DESCRIPTION OF PREFERRED EMBODIMENT

Figure 1:
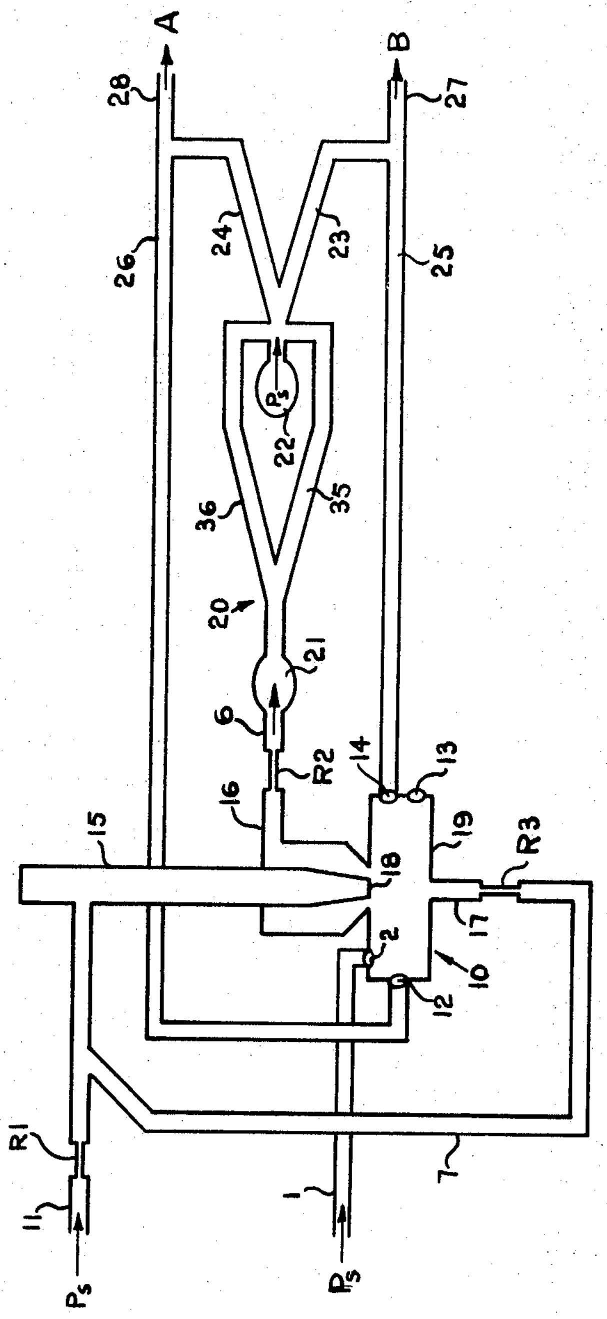
FIG. 1 is a side view of a preferred embodiment of a vortex device in combination with a complementary flip-flop.

Referring now to FIG. 1, a vortex device 10, which is a fluidic proportional device, is shown in combination with a complementary flip-flop 20, which is a fluidic digital device. In the preferred embodiment of the vortex device 10, a plurality of ports 2, 11, 12, 13, 14, 16, 17 communicate with and permit the entrance and exit of fluids from the vortex chamber 19. Inlet supply port 11 and 1 are for receiving a pressurized fluid ($P_s$, not necessarily the same pressure) from an external supply (not shown) and inlet port 13 is for receiving a control signal from an external source (not shown). Inlet ports 12 and 14 are for receiving feedback signals from the flip-flop 20. Outlet port 17 (axial bleed port) which is coupled to the inlet port 11 by passage 7 provides a feedback path to the vortex chamber 19 to improve the signal to noise ratio. The outlet port 16 is the main outlet from the vortex chamber 19 and is coupled by passage 6 to inlet 21 of the complementary flip-flop 20.

The arrangement of the inlets and outlets is important to the proper operation of the vortex device 10 and inlet port 13 is located so that fluid introduced into inlet 13 imparts a tangential force upon the fluid flowing through vortex chamber 19. Similarly, fluid entering inlet ports 12 and 14 also impart a tangential force upon the fluid flowing through the vortex chamber 19. The preferred arrangement of inlet ports 12, 13 and 14 is such that fluid entering inlet port 13 imparts a tangential force in the same direction as fluid entering inlet port 14 and in a different direction (opposite) from fluid entering inlet port 12. Although it is not completely understood how the vortex device 10 produces a pulsating output in the absence of tangential inputs, it is known that tubulation 15, which introduces fluid into the vortex chamber 19, must be axially located with respect to the chamber 19, and that the orifice 18 in the tubulation 15 be approximately the same size as the axial outlet port 17.

Restrictions R1, R2, and R3 are strategically located in the inlet and outlet passages to raise the signal to noise ratio of the vortex device 10.

It is preferred that the digital device 20 used in combination with the proportional device 10 to achieve the objects of my invention be a complementary flip-flop. Examples of this type of flip-flop are described in U.S. Pat. No. 3,001,698; 3,226,023; and 3,348,773.

The preferred embodiment of the complementary flip-flop 20 includes inlets 21,22 and outlets 23,24, all of which communicate with passages 35 and 36. The inlet supply port 22 is for receiving a constant supply pressure ($P_s$) and inlet 21 is for receiving a control signal from the outlet 16 of vortex device 10. Each of the outlets 23,24 branch into passageways 25,27 and 26,28, respectively, to supply signal feedback paths 25,26 to the vortex device 10 and signal output paths 27,28. The feedback signals to vortex inlets 12 and 14 are a proportionate part of the flip-flop output signals from outlets 23 and 24. Outputs A and B, from the flip-flop 20, are transmitted through passages 27 and 28 and are time modulated pulses proportional to the magnitude of the control signal applied to the vortex device 10. Although two outputs A and B are shown, one output, either A or B, may be sufficient for a particular application. Also, although only one flip-flop 20 is used in combination with the vortex device 10, two or more flip-flop stages can be used to further amplify the output signals A and B. A description of how this particular type of flip-flop device 20 operates may be found in U.S. Pat. No. 3,348,773.

Figure 2:
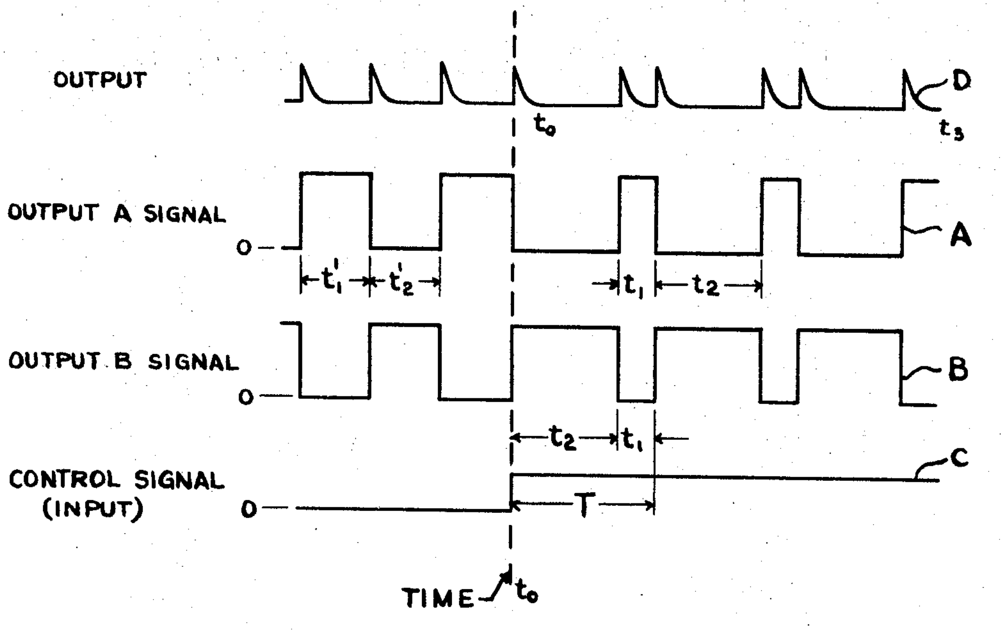
FIG. 2 is a composite graphical representation of performance characteristics of the preferred arrangement shown in FIG. 1.

Referring now to the graphs shown in FIG. 2 which shows the change in pulse width per cycle in output signals A and B in response to a change in magnitude of a control signal applied to the vortex device 10. Curves A and B are a graphical representation of the corresponding output signals A and B transmitted from passages 27 and I L of flip-flop 20; Curve C represents the control signal applied to inlet port 13 of the vortex device; and Curve D is a graphical representation of the output signal from outlet port 16 of the vortex device 10. The graphs are all on the same time scale so that the response from different parts of the system for the same point in time may be compared. The point in time when a control signal is applied to the input 13 of vortex device 10 is designated $t_0$. The time required for one complete period ($T$) without a control signal applied to the vortex device 10 is $t'_1+t'_2$ and $t_1+t_2$ with a control signal applied. The time period $T$ remains essentially the same whether or not a control signal is applied to the vortex device. Therefore, a first half cycle period can be represented by the component $t'_1$ or $t_1$ and the second half cycle period can be represented by $t'_2$ or $t_2$ and $t'_1+t'_2$ or $t_1+t_2$ each represent one complete period $T$ which is the total time interval for output A or output B to complete one cycle. As can be seen from the curves, the first half cycle period is not equal to the second half cycle period when a control signal is applied to the vortex device. In other words, the time periods (pulse width) for the first half cycle period $t_1$ and the second half cycle period $t_2$ change as the magnitude of the control signal applied to the vortex device 10 changes. Therefore, since the total time period $T$ remains essentially constant with a change in the magnitude of the control signal, the time unbalance $\Delta t$ between the first and second half cycle periods can be expressed as the difference between the first and second half cycle periods ($\Delta t = t_1 - t$). In the absence of a control signal, the pulse width of an output pulse and the time interval between output pulses is essentially equal (See curves A and B prior to time $t_0$) therefore, there is no time unbalance since $t_1 - t_2 = 0$a{. The time modulated output produced by the combination may, therefore, be unbalanced by inserting a unidirectional control flow (signal) which makes the amount of unbalance proportional to the control flow. To understand the principles upon which it is believed the time unbalance and frequency limit cycle can be manipulated, the following example is offered:

EXAMPLE A

When the flip-flop 20 has a time delay and time constant less than the shortest half cycle period (smaller of $t_1$ or $t_2$) then the time unbalance $\Delta t$ which is $t_1 - t_2$ may be found as follows:

The first half cycle period $t_1$ may be expressed:

$$At_1 + PBt_1 = 1$$

Where: $A$ = quiescent pulse rate level (p.p.s.)

$B$ = change in pulse rate per unit change in input (p.p.s./p.s.i.)

$P$ = input (p.p.s./p.s.i.)

$P$ = input (p.s.i.)

the second half cycle period $t_2$ may be expressed:

$$At_2 - PBt_2 = 1$$

From the above, $t_1$ and $t_2$ may be expressed:

$$t_1 = \frac{1}{A+PB} \qquad t_2 = \frac{1}{A-PB}$$

The time unbalance $t$ which is $t_1 - t_2$ may then be expressed in normalized from (dimensionless) as:

$$t = \frac{t_1 - t_2}{t_1 + t_2}$$

which by substituting the above is $$= -\frac{PB}{A}$$

From the above it is seen that the time unbalance (dimensionless $\Delta t$) is proportional to input pressure $P$. Differentiating ($d/dp$) the above equation with respect to input pressure the gain is expressed as $$\frac{d\left(\frac{t_1 - t_2}{t_1 + t_2}\right)}{dp} = \frac{-B}{A}$$

From the last equation it can be seen that by raising $A$, gain can be reduced, and, since $A$ is the quiescent pulse rate level, $A$ may be changed by changing the supply pressure to the flip-flop 20. From the preceding, the limit cycle period ($t_1 + t_2$) may now be expressed in terms of the above parameters as:

$$T = t_1 + t_2 = \frac{2A}{A^2 + P^2B^2}$$

and for values of $A >> (PB)$ max $$t_1 + t_2 \approx \frac{2}{A}$$

and the frequency limit cycle F1c which is $\frac{1}{t_1 + t_2}$ may be expressed as follows:

$$Flc = \frac{A}{2}$$

From this equation, it can be seen that by changing $A$ for gain adjustment, the limit cycle frequency also changes. The larger $A$ is, the larger the limit cycle frequency F1c. At low gain the limit frequency is larger causing less ripple at the output.

While I have disclosed a preferred embodiment of my invention, it will be apparent to those skilled in the art that changes may be made to the apparatus described without departing from the spirit of the invention, as set forth in the appended claims, and, in some cases, certain features of the invention may be used to advantage without corresponding use of other features. For example, should there be a slight difference in pulse width without a control signal applied to the vortex device 10 as a result of structural tolerances of the devices 10,20, an error signal may be introduced to compensate for and eliminate the difference in pulse widths. Accordingly, it is intended that the illustrative and descriptive materials employed herein be used to illustrate the principles of the invention and not to limit the scope thereof.

I claim:

1. A fluid vortex device for producing an oscillating output signal which comprises:

a housing having a cylindrical chamber, said chamber having an axial output port;

outlet means communicating with said chamber;

means for introducing a first fluid flow axially into said chamber;

means for introducing a second fluid flow tangentially into said chamber said flow having a first direction;

means for introducing a third fluid flow tangentially into said chamber said flow having a sense of direction different from said second fluid flow;

means for introducing a fourth fluid flow tangentially into said chamber said flow having a sense of direction opposite said second fluid flow;

means for introducing a fifth fluid flow axially into said chamber; and means for connecting said axial output port to said means for introducing a first fluid flow axially into said chamber.

2. An apparatus as recited in claim 1 wherein said chamber axial output has a restriction therein.

3. In a fluid system, an apparatus for converting an analog signal to a digital signal which comprises:

an apparatus as recited in claim 2; and a complementary flip-flop having input means for receiving signals from said vortex outlet means, and first and second output means, said first output means communicating with said vortex means for introducing a second fluid flow into said chamber, and said second output means communicating with said vortex means for introducing a fourth fluid flow into said chamber.

4. An apparatus as recited in claim 2 wherein said outlet means includes a port having a restriction therein.

5. In a fluid system, an apparatus for converting an analog signal to a digital signal which comprises:

an apparatus as recited in claim 4; and a complementary flip-flop having input means for receiving signals from said vortex outlet means, and first and second output means, said first output means communicating with said vortex means for introducing a second fluid flow into said chamber, and said second output means communicating with said vortex means for introducing a fourth fluid flow into said chamber.

6. An apparatus as recited in claim 4 wherein said means for introducing a first fluid flow axially into said chamber, includes a passage having a restriction therein, said restriction located upstream from said connecting means.

7. In a fluid system, an apparatus for converting an analog signal to a digital signal which comprises:

an apparatus as recited in claim 4; and a complementary flip-flop having input means for receiving signals from said vortex outlet means, and first and second output means, said first output means communicating with said vortex means for introducing a second fluid flow into said chamber, and said second output means communicating with said vortex means for introducing a fourth fluid flow into said chamber.

8. In a fluid system, an apparatus for converting an analog signal to a digital signal which comprises:

a vortex device having a chamber, a first and second output means communicating with said cavity, a first, second, third, fourth and fifth input means communicating with said cavity and feedback means communicating with said first input means and said second output means; and a complementary flip-flop having input means for receiving a signal from the first output of said vortex device and first and second output means, said flip-flop first output means communicating with said vortex second input means and said flip-flop second output means communicating with said vortex fourth input means.

9. An apparatus as recited in claim 8 wherein said vortex first input means and said vortex first and second output means include conduits having restrictions therein.